(12) United States Patent
Huh et al.

(10) Patent No.: US 10,511,400 B2
(45) Date of Patent: Dec. 17, 2019

(54) OPTICAL MULTIPLEXER FOR MULTIPLEXING OPTICAL SIGNALS USING OPTICAL WAVEGUIDE BLOCK INCLUDING LAMINATED LAYERS

(71) Applicant: ELECTRONICS AND TELECOMMUNICATIONS RESEARCH INSTITUTE, Daejeon (KR)

(72) Inventors: Joon Young Huh, Daejeon (KR); Sae-Kyoung Kang, Daejeon (KR); Joon Ki Lee, Sejong-si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 16/124,766

(22) Filed: Sep. 7, 2018

(65) Prior Publication Data

US 2019/0229828 A1    Jul. 25, 2019

(30) Foreign Application Priority Data

Jan. 22, 2018  (KR) .......................... 10-2018-0007565
May 8, 2018    (KR) .......................... 10-2018-0052337

(51) Int. Cl.
*H04B 10/00*   (2013.01)
*H04J 14/02*   (2006.01)
(Continued)

(52) U.S. Cl.
CPC ............ *H04J 14/02* (2013.01); *G02B 6/4206* (2013.01); *H04B 10/25* (2013.01)

(58) Field of Classification Search
CPC ...... G02B 2006/12164; G02B 6/12007; G02B 6/12016; G02B 6/2938; G02B 6/42; G02B 6/4204; G02B 6/4206; G02B 6/425
See application file for complete search history.

(56) References Cited

U.S. PATENT DOCUMENTS 6,275,317 B1 *  8/2001  Doerr .................. H04B 10/505
                                                        398/183
8,939,656 B2    1/2015  Takahashi et al.
(Continued)

FOREIGN PATENT DOCUMENTS

JP       2000321452 A     11/2000
KR    10-2003-0051742 A    6/2003
(Continued)

OTHER PUBLICATIONS

Takaharu Ohyama et al., "Compact Hybrid Integrated 100-Gb/s Transmitter Optical Sub-Assembly Using Optical Butt-Coupling Between EADFB Lasers and Silica-Based Awg Multiplexer", Journal of Lightwave Technology, vol. 34, No. 3, Feb. 2016.

*Primary Examiner* — Daniel G Dobson
(74) *Attorney, Agent, or Firm* — LRK Patent Law Firm

(57) ABSTRACT

An optical multiplexer including an optical waveguide block including a plurality of waveguides for adjusting an optical path of the plurality of optical signals. Optical signals generated in light sources having different wavelengths are input to ports of one side that is an input end of the optical waveguide block, propagated through waveguides connected to the ports, and output to ports of another side that is an output end of the optical wavelength block. Intervals between the waveguides decrease in a direction from the input end to the output end. Intervals between the ports of the input end are smaller than intervals between the ports of the output end. The optical waveguide block has a structure (Continued)

in which at least one layer having at least one waveguide is laminated.

19 Claims, 14 Drawing Sheets

(51) Int. Cl.
*G02B 6/42* (2006.01)
*H04B 10/25* (2013.01)
*H04J 14/00* (2006.01)

(56) References Cited

U.S. PATENT DOCUMENTS

| | | |
|---|---|---|
| 2012/0207437 A1 | 8/2012 | Kang et al. |
| 2013/0216184 A1* | 8/2013 | Kopp ................ G02B 6/30 385/43 |
| 2014/0133870 A1 | 5/2014 | Lee et al. |
| 2014/0301735 A1* | 10/2014 | Okada ............... H04J 14/02 398/86 |
| 2017/0359126 A1 | 12/2017 | Ho et al. |
| 2018/0337743 A1* | 11/2018 | Jou ................ G02B 6/428 |

FOREIGN PATENT DOCUMENTS

| | | |
|---|---|---|
| KR | 1020050053176 A | 6/2005 |
| KR | 1020090047112 A | 5/2009 |
| KR | 1020110050941 A | 5/2011 |
| KR | 1020140037922 A | 3/2014 |

* cited by examiner

OPTICAL MULTIPLEXER FOR MULTIPLEXING OPTICAL SIGNALS USING OPTICAL WAVEGUIDE BLOCK INCLUDING LAMINATED LAYERS

CROSS-REFERENCE TO RELATED APPLICATION(S)

This application claims the priority benefit of Korean Patent Application No. 10-2018-0007565 filed on Jan. 22, 2018 and Korean Patent Application No. 10-2018-0052337 filed on May 8, 2018, in the Korean Intellectual Property Office, the disclosures of which are incorporated herein by reference for all purposes.

BACKGROUND

1. Field of the Invention

One or more example embodiments relate to an optical multiplexer.

2. Description of Related Art

An optical transceiver may be a device that converts an electrical signal into an optical signal or converts the optical signal into the electrical signal. As network traffic increases, methods of increasing a capacity of the optical transceiver are being studied. A wavelength division multiplexing (WDM) method is a method of increasing the capacity of the optical transceiver, for example, a method of multiplexing optical signals having different wavelengths into one optical fiber to be transmitted. The WDM method has been used for medium and long distance optical transmission networks and, currently, applied to a short distance optical transmission network such as Ethernet. The optical transceiver to which the WDM method is applied may include an optical multiplexer that multiplexes optical signals having a plurality of wavelengths into one optical fiber.

SUMMARY

An aspect provides an optical multiplexer to multiplex optical signals having different wavelengths into one optical fiber with increased ease.

According to an aspect, there is provided an optical multiplexer for multiplexing a plurality of optical signals, the optical multiplexer including an optical waveguide block including a layer having a plurality of waveguides on which the plurality of optical signals are propagated and a lens configured to output a multiplexed optical signal by collecting the plurality of optical signals output from the plurality of waveguides into one optical signal, wherein an interval between the plurality of optical signals output from the optical waveguide block is smaller than an interval between the plurality of optical signals input to the optical waveguide block.

The plurality of waveguides may be arranged on the layer such that the interval between the plurality of optical signals output from the plurality of waveguides is minimized.

When the optical waveguide block includes a plurality of layers, the plurality of layers may be laminated perpendicular to a direction in which a waveguide is disposed on each of the plurality of layers.

Each of the plurality of layers may include a mark having a preset shape to be used to align the plurality of layers when the plurality of layers is laminated.

Each of the plurality of layers may include a groove configured to receive a guide pin used when the plurality of layers is laminated.

The plurality of waveguides may be arranged symmetrically based on a center axis of the lens.

Each of the plurality of optical signals may have a different wavelength.

According to another aspect, there is also provided an optical multiplexer for multiplexing a plurality of optical signals, the optical multiplexer including a plurality of input ports configured to receive the plurality of optical signals, an optical waveguide block including a layer having a plurality of waveguides corresponding to the plurality of input ports such that the plurality of optical signals is propagated through the plurality of waveguides, a plurality of output ports configured to output the plurality of optical signals propagated through the plurality of waveguides, and a lens configured to output a multiplexed optical signal by collecting a plurality of optical signals output from the plurality of output ports into one optical signal, wherein a distance between the plurality of input ports is determined based on a physical interference between the optical signals, a mutual crosstalk between channels, or a size and an arrangement of a light source element.

A distance between the plurality of output ports may be determined based on an acceptable margin of the lens.

When the optical waveguide block includes a plurality of layers, the plurality of layers may be laminated perpendicular to a direction in which a waveguide is arranged on each of the plurality of layers.

The optical waveguide block may have a surface polished based on a preset inclination angle such that the plurality of optical signals output from the plurality of output ports is symmetrical to the lens.

Each of the plurality of optical signals may have a different wavelength.

A plurality of layers included in the optical waveguide block may be aligned based on a mark generated in each of the plurality of layers.

According to still another aspect, there is also provided an optical multiplexer for multiplexing a plurality of optical signals, the optical multiplexer including an optical waveguide block configured to adjust optical paths of the plurality of optical signals and a lens configured to output a multiplexed optical signal by collecting a plurality of optical signals of which the optical paths are adjusted, wherein the optical waveguide block is obtained by combining layers, each having a plurality of waveguides used to adjust the optical paths.

The optical waveguide block may include a first surface configured to receive the plurality of optical signals and a second surface configured to output the received plurality of optical signals, and wherein an interval between the plurality of optical signals output from the second surface may be smaller than an interval between the plurality of optical signals received in the first surface.

The plurality of waveguides may be arranged on each of the layers such that the interval between the plurality of optical signals output from the plurality of waveguides is minimized.

When the optical waveguide block includes a plurality of layers, the plurality of layers may be laminated perpendicular to a direction in which a waveguide is disposed on each of the plurality of layers.

The optical waveguide block may include a guide pin used when the plurality of layers is laminated.

Each of the layers may include a groove configured to receive the guide pin.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
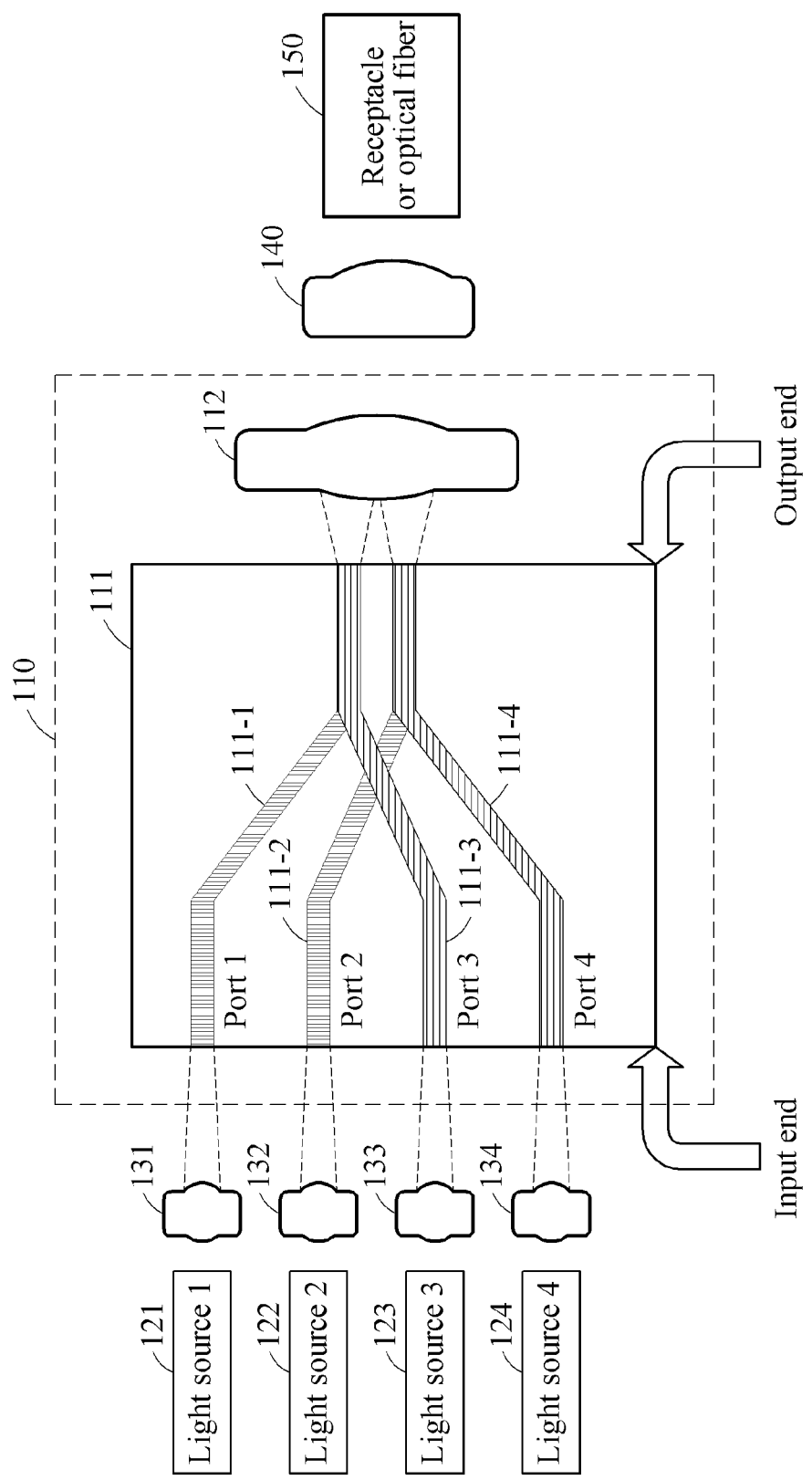
FIG. 1 is a diagram illustrating an optical multiplexer according to an example embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, example embodiments will be described in detail with reference to the accompanying drawings, wherein like reference numerals refer to the like elements throughout.

FIG. 1 is a diagram illustrating an optical multiplexer 110 according to an example embodiment. The optical multiplexer 110 may be included in an optical transceiver to which a wavelength division multiplexing method is applied. The optical multiplexer 110 may be used to multiplex optical signals having different wavelengths into one optical signal. Although FIG. 1 illustrates four light sources as an example, a number of light sources to which the optical multiplexer 110 is applied is not limited thereto.

Optical signals generated in a plurality of light sources, for example, a light source 1 121, a light source 2 122, a light source 3 123, and a light source 4 124 may be input to the optical multiplexer 110. Referring to FIG. 1, optical signals may be output from the light source 1 121, the light source 2 122, the light source 3 123, and the light source 4 124 toward the optical multiplexer 110. The light source 1 121 through the light source 4 124 may generate optical signals having different wavelengths. Intervals or distances between the light source 1 121 through the light source 4 124 may be determined based on a chip size of each of the plurality of light sources and electrical crosstalk between channels of the plurality of light sources. Distances or intervals between the optical signals input from the light source 1 121 through the light source 4 124 to an optical waveguide block 111 may be greater than distances or intervals between the optical signals output from the optical waveguide block 111.

The optical waveguide block 111 used to align optical paths of the optical signals may be included in the optical multiplexer 110. The optical signals output from the plurality of light sources may be received at an input end on one side of the optical waveguide block 111 through first lenses corresponding to the optical signals. When the optical signal is received in the optical waveguide block 111, the first lens may be disposed between the corresponding light source and the optical waveguide block 111 to reduce an insertion loss of the optical signal. In a case of, for example, a butt coupling scheme, the optical signals output from the plurality of light sources may be transferred to the optical waveguide block 111 without using the first lenses. Referring to FIG. 1, the first lenses respectively corresponding to the light source 1 121, the light source 2 122, the light source 3 123, and the light source 4 124 may be a lens 101 131, a lens 1-2 132, and a lens 1-3 133, and a lens 1-4 134.

Waveguides corresponding to the optical signals may be included in the optical waveguide block 111. The waveguide may be a portion that adjusts a shape of an optical path in the optical waveguide block 111. The waveguide may be formed by doping germanium or phosphorus into the layer of the optical waveguide block 111 with silicon dioxide ($SiO_2$).

A material of the layer and a doped material may be the same or different. The optical waveguide block 111 including the waveguides may be formed of, for example, silicon. When different materials and different doping are used, a second lens 112 may not be used.

The optical waveguide block 111 may be a passive element and implemented as a planar light-wave circuit (PLC). For example, the optical waveguide block 111 may be implemented based on waveguides formed on a silica substrate or a quartz substrate. Referring to FIG. 1, the light source 1 121, the light source 2 122, the light source 3 123, and the light source 4 124 may correspond to a waveguide 1 111-1, a waveguide 2 111-2, a waveguide 3 111-3, and a waveguide 4 111-1. respectively.

The optical signals may be propagated from the input end of the optical waveguide block 111 to the output end of the optical waveguide block 111 through the corresponding waveguides. Intervals between the waveguides may be gradually reduced in a direction from the input end toward the output end. Thus, a distance or interval between the optical signals output from the output end may be less than a distance or interval between the optical signals received in the input end. For example, the distance or interval between the optical signals received in the input end may be hundreds of micrometers (μm) and the distance or interval between the optical signals output from the output end may be tens of micrometers.

The second lens 112 that collects the optical signals output from the optical waveguide block 111 may be included in the optical multiplexer 110. The distance or interval between the optical signals output from the output end may be less than or equal to an acceptable margin of the second lens 112. For example, a distance or interval between the waveguides outputting the optical signals at the output end may be less than or equal to the acceptable margin of the second lens 112. Through this, the optical signals input to the second lens 112 may be multiplexed and output from the second lens 112 as one optical signal.

The optical signals combined by the second lens 112 may pass through a third lens 140 and be transmitted to a receptacle or optical fiber 150. To increase an optical signal transmission efficiency between the optical multiplexer 110 and the receptacle or optical fiber 150, the third lens 140 may be disposed between the second lens 112 and the receptacle or optical fiber 150. The third lens 140 may be an element to be selectively used instead of an essential element.

The waveguides in the optical waveguide block 111 may be arranged on different planes of the optical waveguide block 111. Referring to FIG. 1, the waveguide 1 111-1 and the waveguide 2 111-2 corresponding to the light source 1 121 and the light source 2 122 may be arranged on a first plane and the waveguide 3 111-3 and the waveguide 4 111-4 corresponding to the light source 3 123 and the light source 4 124 may be arranged on a second plane.

The first plane and the second plane may be parallel to each other and spaced apart by a predetermined distance. A distance between the first plane and the second plane may be less than or equal to the acceptable margin of the second lens 112. Thus, the interval between the optical signals output from the optical waveguide block 111 may be less than or equal to the acceptable margin of the second lens 112.

The waveguides of the optical waveguide block 111 may be separately arranged on a plurality of planes spaced apart by a predetermined distance instead of the same axis. In this example, locations of the light source 1 121 through the light source 4 124 may be determined based on locations of the waveguides in the input end of the optical waveguide block 111.

Figure 2:
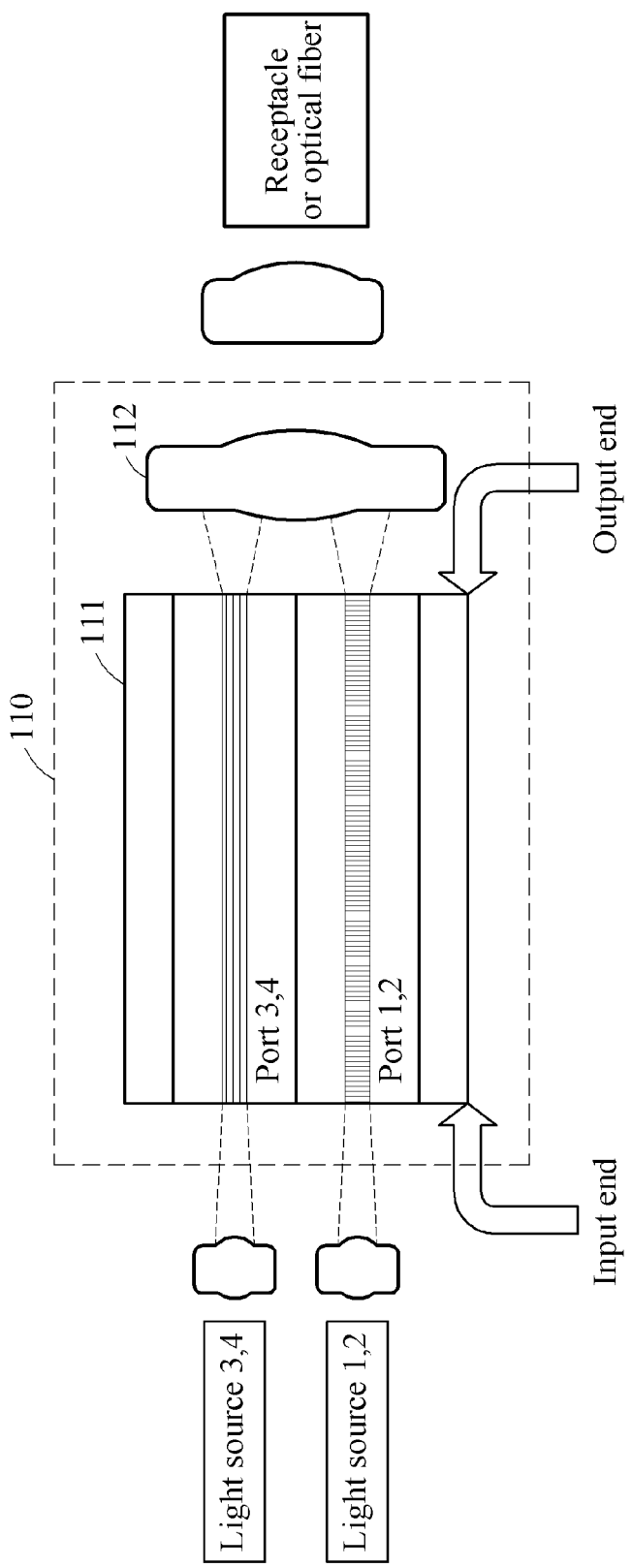
FIG. 2 is a diagram illustrating the optical multiplexer of FIG. 1 viewed from a different direction.

FIG. 2 is a diagram illustrating the optical multiplexer 110 of FIG. 1 viewed from a different direction. For example, FIG. 1 is a top view of the optical multiplexer 110 and FIG. 2 is a side view of the optical multiplexer 110.

Referring to FIG. 2, waveguides may be respectively arranged on a plurality of layers of the optical waveguide block 111 of the optical multiplexer 110.

A layer including a waveguide 1 and a waveguide 2 corresponding to a light source 1 and a light source 2 may be spaced apart from a layer including a waveguide 3 and a waveguide 4 corresponding to a light source 3 and a light source 4 at an interval less than or equal to an acceptable margin of the second lens 112. When the optical waveguide block 111 is formed of silicon instead of a silica material, the second lens 112 may not be used.

When n waveguides of the optical waveguide block 111 are arranged on each of m layers, m×n optical signals having different wavelengths may be multiplexed by the optical multiplexer 110. As illustrated in FIGS. 1 and 2, the optical waveguide block 111 may include two layers, each including two waveguides and thus, four optical signals (=2×2) may be multiplexed by the optical multiplexer 110.

Output ports of an output end of the optical waveguide block 111 may be arranged to have minimal intervals therebetween. The waveguides may be arranged such that the intervals between the output ports are minimized. Thus, when the two waveguides are arranged to each of the two layers, the interval between the output ports may be minimized.

Figure 3:
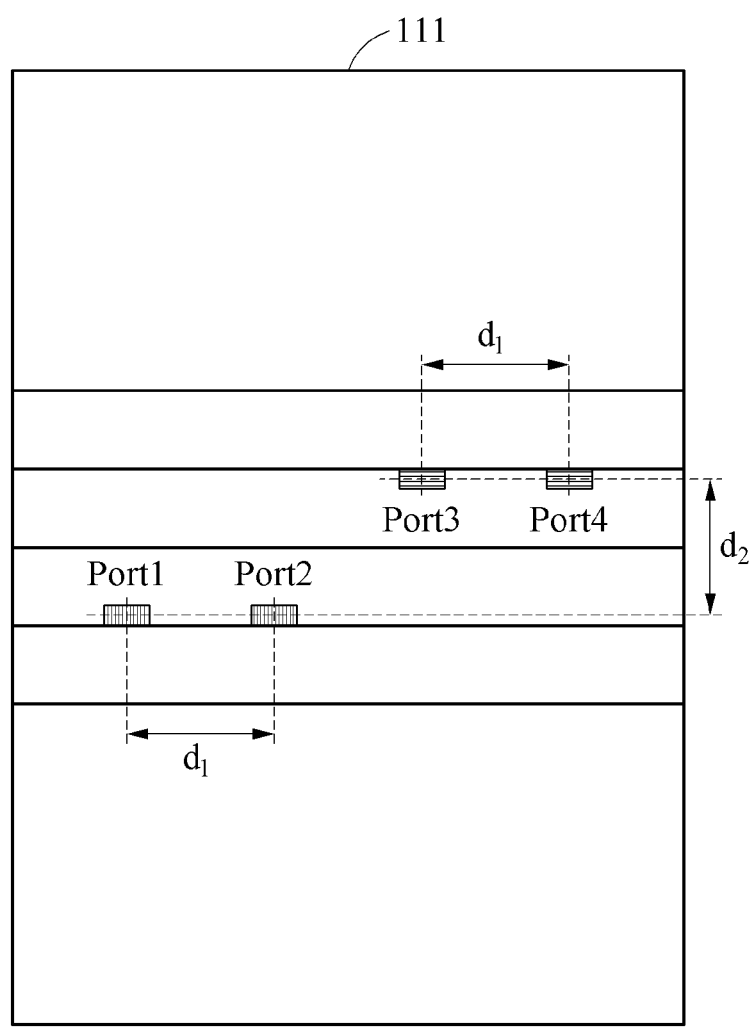
FIG. 3 is a diagram illustrating an arrangement of waveguides in an input end of an optical waveguide block of FIGS. 1 and 2.

FIG. 3 is a diagram illustrating an arrangement of waveguides in an input end of the optical waveguide block 111 of FIGS. 1 and 2.

The optical waveguide block 111 may include a plurality of layers. Referring to FIG. 3, the optical waveguide block 111 may be generated by combining the plurality of layers. Each of the plurality of layers may be generated by accumulating silica buffers with $SiO_2$ on a substrate. A thickness of the silica buffer may be about tens of micrometers. A waveguide may be engraved in the silica buffer. A method of combining the plurality of layers will be described later.

The optical waveguide block 111 may include four waveguides to minimize intervals between output ports of the optical waveguide block 111.

FIG. 3 illustrates ports to transfer optical signals received in an input end to corresponding waveguides. Since the optical waveguide block 111 includes the four waveguides, four ports, for example, a port 1, a port 2, a port 3, and a port 4 corresponding to the four waveguides may be arranged at the input end of the optical waveguide block 111.

An x-axial interval $d_1$ between ports of the input end may be determined based on at least one of a size of a light source corresponding to each of the ports, characteristics of channels generated in the light sources, and an interference between the channels. A y-axial interval $d_2$ between the ports of the input end may be determined based on at least one of the size of the light source corresponding to each of the ports, the characteristics of the channels generated in the light sources, the interference between the channels, and an alignment margin or an acceptable margin of a lens, for example, the second lens 112 of FIG. 1 that multiplexes optical signals at the output end of the optical waveguide block 111 into one optical signal.

In the example embodiment, since the ports of the input end are distributed, the light sources outputting the optical signals toward the optical waveguide block 111 may be arranged based on the locations of the ports. For example, a lens or an object for adjusting heights or the locations of the light sources based on the y-axial interval $d_2$ between the ports may be used.

Referring to FIG. 3, the port 1 and the port 2 may be arranged on the same x axis and the port 3 and the port 4 may be arranged on the same x axis. Also, the port 1, the port 2, the port 3, and the port 4 are arranged on different y axes. However, embodiments are not limited to such arrangement of the ports of the input end.

The ports of the input end may be arranged on the same x axis, the same y axis, different x axes, or different y axes. In one example, the port 1 and the port 3 may be arranged on different x axes and the same y axis, and the port 2 and the port 4 may be arranged on different x axes and the same y axis. In another example, the port 1 and the port 3 may be arranged on different x axes and the same y axis, and the port 2 and the port 4 may be arranged on different x axes and different y axes. In still another example, the port 1 and the port 3 may be arranged on different x axes and different y axes, and the port 2 and the port 4 may be arranged on different x axes and different y axes. However, embodiments are not limited thereto.

Figure 4:
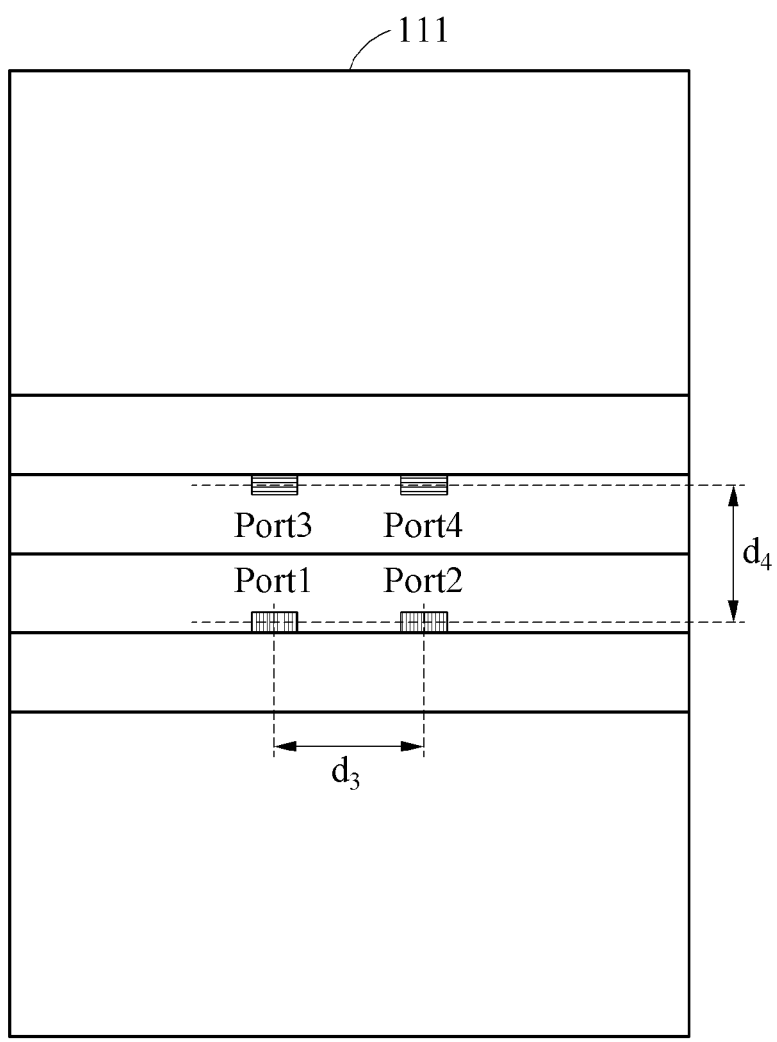
FIG. 4 is a diagram illustrating an arrangement of waveguides in an output end of the optical waveguide block of FIGS. 1 through 3.

FIG. 4 is a diagram illustrating an arrangement of waveguides in an output end of the optical waveguide block 111 of FIGS. 1 through 3.

Referring to FIG. 4, optical signals propagated from four waveguides of the optical waveguide block 111 may be output by four ports. A port may be an area related to a cross section of a waveguide and may include a lens to output an optical signal.

An x-axial interval $d_3$ between ports of an output end may be determined based on an alignment margin or an acceptable margin of a lens that multiplexes optical signals of the output end into one optical signal. Likewise, an y-axial interval $d_4$ between the ports may be determined based on the alignment margin or the acceptable margin of the lens that multiplexes the optical signals of the output end into one optical signal. The x-axial interval $d_3$ and the y-axial interval $d_4$ may be, for example, less than or equal to tens of micrometers. When the ports of the output end are arranged adjacent to one another, the optical signals output from the optical waveguide block 111 may be multiplexed into one optical signal.

At the output end of the optical waveguide block 111, the four ports outputting the optical signals may be arranged radially or in a lattice shape about an axis of a lens, for example, the second lens 112 of FIG. 1 that multiplexes the optical signals based on the optical waveguide block 111.

Referring to FIG. 4, the port 1 and the port 2 may be arranged on the same x axis and the port 3 and the port 4 may be arranged on the same x axis. Also, the port 1 and the port 3 may be arranged on the same y axis and the port 2 and the port 4 may be arranged on the same y axis. In the example of FIG. 4, the ports 1 through 4 may be symmetrically arranged in a forward direction. However, embodiments are not limited to such arrangement of the ports of the input end.

The ports of the input end may be arranged on the same x axis, the same y axis, different x axes, or different y axes. In one example, the port 1 and the port 3 may be arranged on different x axes and the same y axis, and the port 2 and the port 4 may be arranged on different x axes and the same y axis. In another example, the port 1 and the port 3 may be arranged on different x axes and the same y axis, and the port 2 and the port 4 may be arranged on different x axes and different y axes. In still another example, the port 1 and the port 3 may be arranged on different x axes and different y axes, and the port 2 and the port 4 may be arranged on different x axes and different y axes. However, embodiments are not limited thereto.

Figure 5:
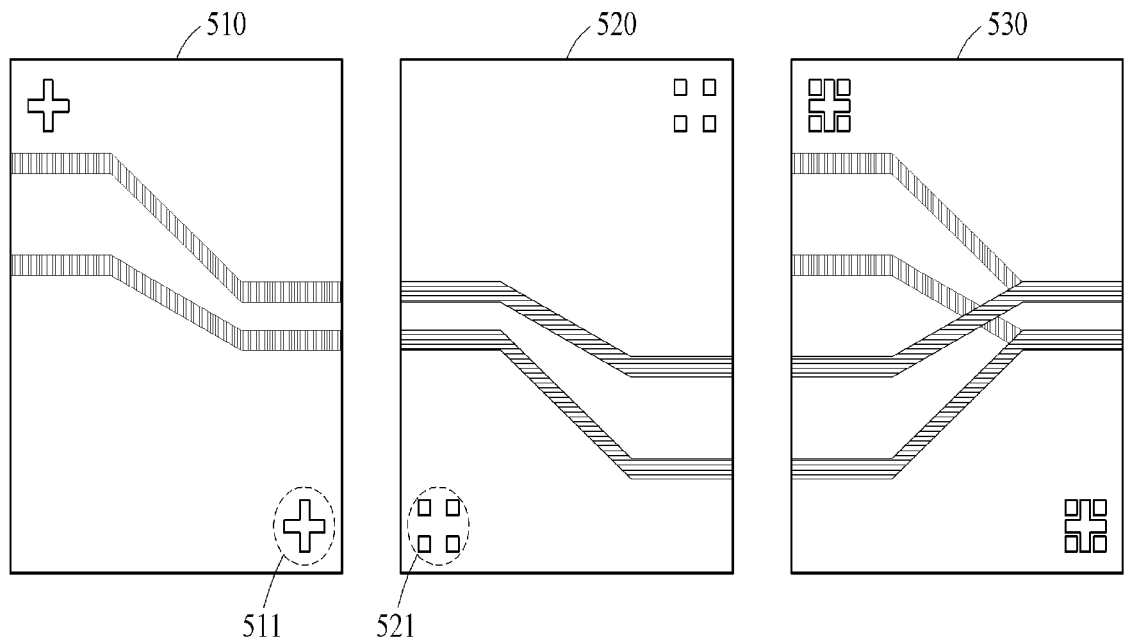
FIG. 5 is a diagram illustrating a method of generating an optical waveguide block of an optical multiplexer using an alignment mark according to an example embodiment.

FIG. 5 is a diagram illustrating a method of generating an optical waveguide block of an optical multiplexer using alignment marks, for example, an alignment mark 1 511 and an alignment mark 2 521 according to an example embodiment.

In the example embodiment, the optical waveguide block may be generated by combining a layer 1 and a layer 2 among a plurality of layers. FIG. 5 illustrates a cross section 510 of the layer 1 and a cross section 520 of the layer 2. Each of the cross section 510 and the cross section 520 may be a top surface of a silica buffer with a waveguide engraved in the corresponding layer. The layers of the optical waveguide block may include alignment marks to be used for combining the layers. The alignment mark may be engraved at a preset location, for example, a remaining portion other than a portion in which the waveguide is engraved in the layer.

The alignment mark may be in a shape for easily combining or aligning the layers. A plurality of aligning marks may be provided on a cross section of a layer. Referring to FIG. 5, the alignment mark 1 511 on the cross section 510 of the layer 1 may be in a cross shape and the alignment mark 512 on the cross section 520 of the layer 2 may be in a shape corresponding to the cross shape of the alignment mark 1 511. When combining the layer 1 and the layer 2, the alignment mark 1 511 and the alignment mark 2 512 may be disposed adjacent to each other but not overlapping, whereby the optical waveguide block is generated by accurately combining the layer 1 and the layer 2.

In some example embodiments, the optical waveguide block may be generated using a physical groove or an etched portion instead of the alignment mark 1 511 and the alignment mark 2 512.

Figure 6A:
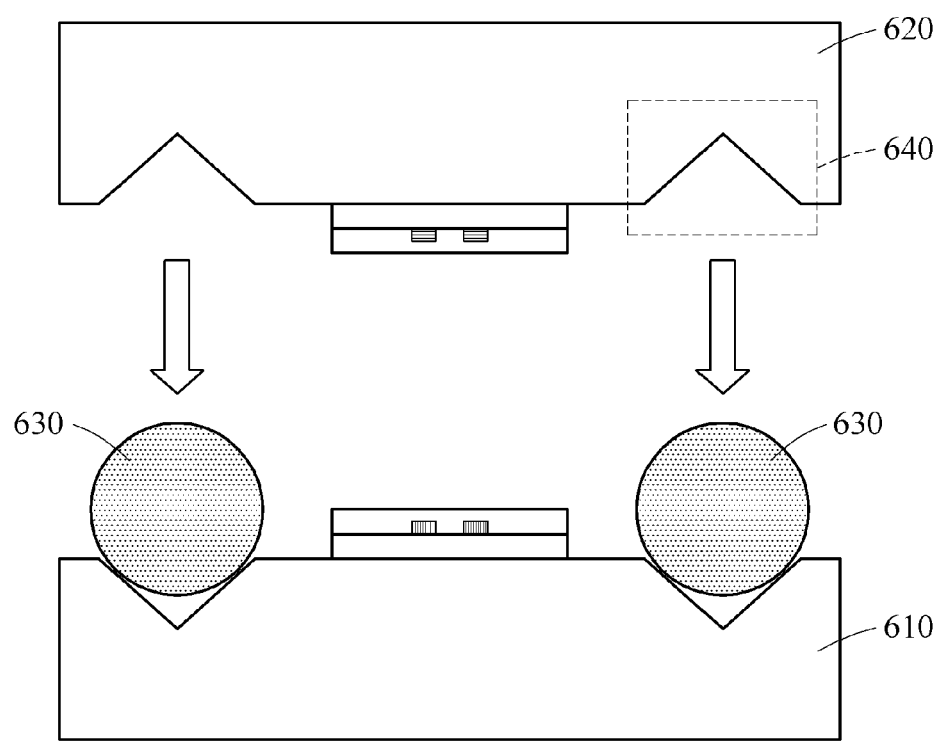
FIGS. 6A and 6B are diagrams illustrating a method of generating an optical waveguide block of an optical multiplexer using a guide pin and a groove according to an example embodiment.
Figure 6B:
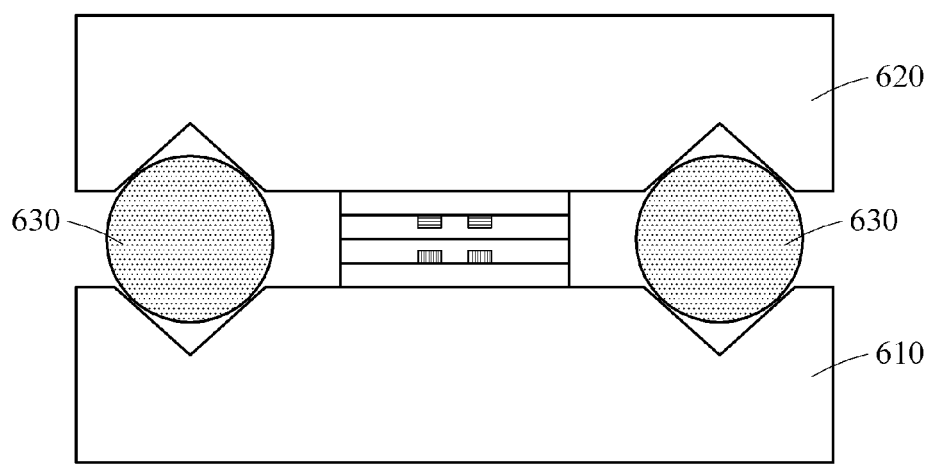

FIGS. 6A and 6B are diagrams illustrating a method of generating an optical waveguide block of an optical multiplexer using a guide pin 630 and a groove 640 according to an example embodiment.

Referring to FIGS. 6A and 6B, a layer 1 610 and a layer 2 620 may each include the groove 640 to be attached to the guide pin 630 formed of, for example, a fiber. The groove 640 may be generated by polishing or etching surfaces of the layer 1 610 and the layer 2 620. The groove 640 may be in a shape of the guide pin 630 or a shape suitable for alignment in addition to a V-shape as shown in FIG. 6. In the example of FIG. 6A, the guide pin 630 may be disposed on the layer 1 610 between the layer 1 610 and the layer 2 620. Thereafter, the layer 1 610 and the layer 2 620 may be easily combined by moving the layer 2 620 toward the layer 1 610 on which the guide pin 630 is disposed.

In some example embodiments, an optical waveguide block may be generated by laminating clad layers.

Figure 7A:
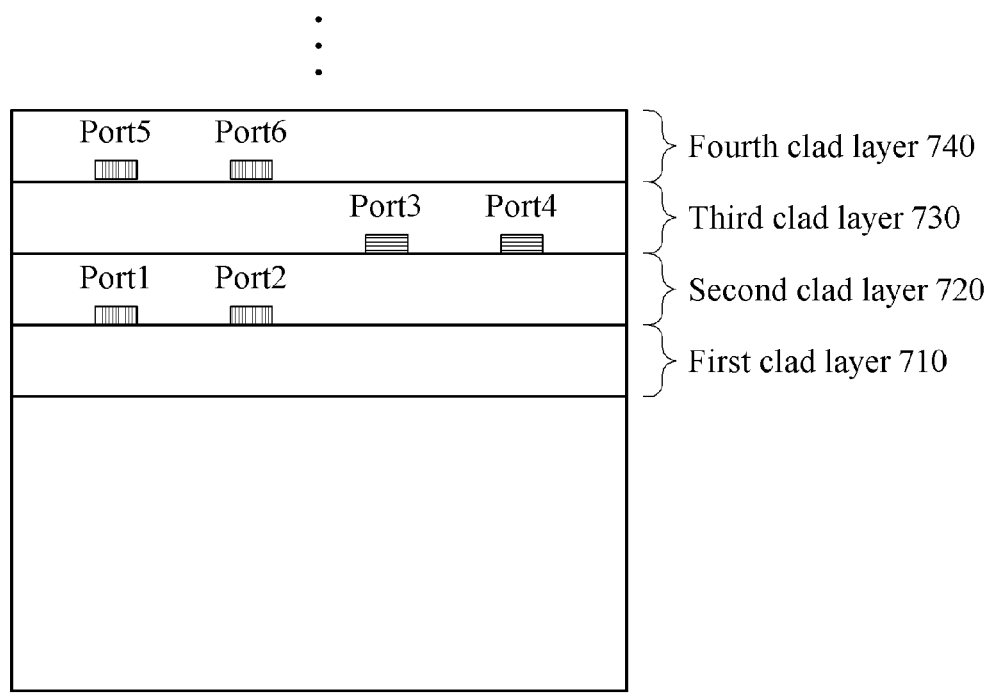
FIGS. 7A and 7B are diagrams illustrating a method of generating an optical waveguide block of an optical multiplexer using a plurality of clad layers according to an example embodiment.
Figure 7B:
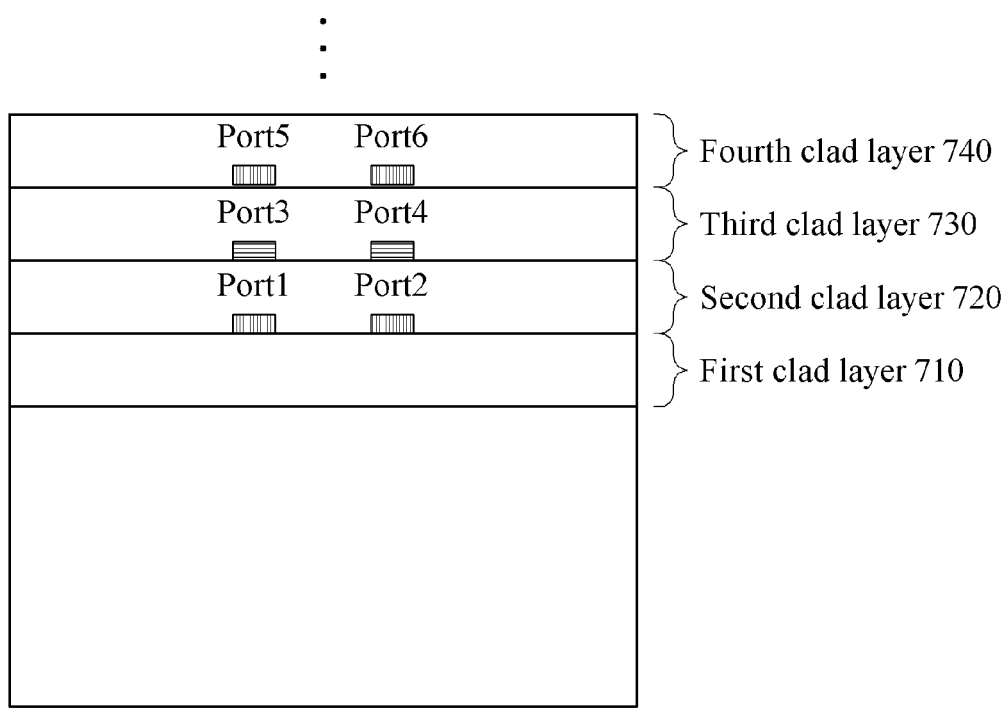

FIGS. 7A and 7B are diagrams illustrating a method of generating an optical waveguide block of an optical multiplexer using a plurality of clad layers according to an example embodiment. FIG. 7A illustrates a portion of an input end of the optical waveguide block and FIG. 7B illustrates a portion of an output end of the optical waveguide block.

The optical waveguide block may be generated by combining a plurality of clad layers, for example, a first clad layer 710, a second clad layer 720, a third clad layer 730, and a fourth clad layer 740 in sequence. Each of the plurality of clad layers may include a waveguide. Referring to FIGS. 7A and 7B, six waveguides may be included in the optical waveguide block by sequentially combining three clad layers, for example, the second clad layer 720, the third clad layer 730, the fourth clad layer 740, each including two waveguides. By sequentially combining the plurality of clad layers, the optical waveguide block including the plurality of layers may be readily manufactured without a combination process as described with reference to FIGS. 5B through 6B.

A lens, for example, the second lens 112 of FIG. 1, that multiplexes the optical signals in the optical multiplexer may be designed to have an alignment margin or an acceptable margin greater than or equal to an interval between the optical signals at the output end of the optical waveguide block. To easily manufacture the lens, the waveguide may be shaped to reduce the interval between the output signal at the output end of the optical waveguide block.

Figure 8:
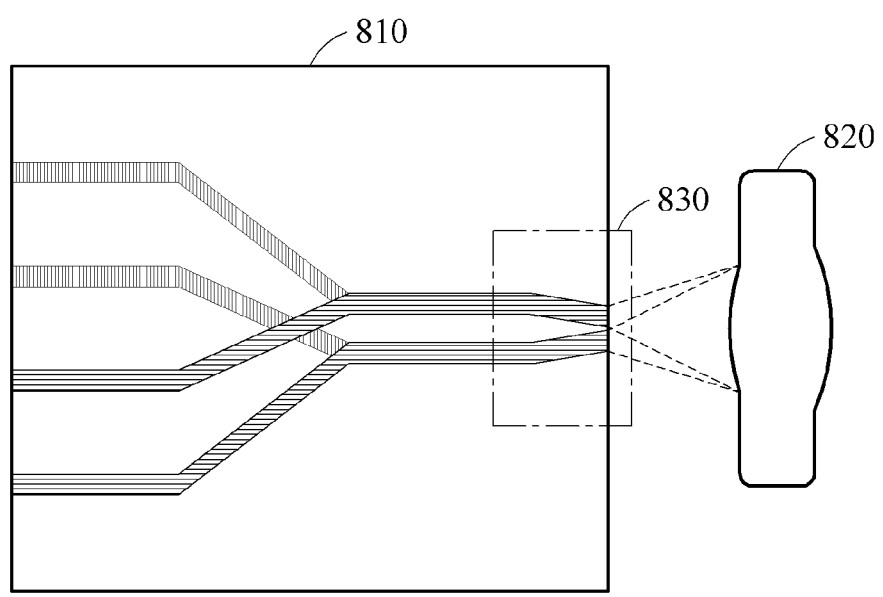
FIG. 8 is a diagram illustrating an optical waveguide block and a lens used to multiplex optical signals according to an example embodiment.

FIG. 8 is a diagram illustrating an optical waveguide block 810 and a lens 820 used to multiplex optical signals and according to an example embodiment.

Referring to FIG. 8, in an area adjacent to an output end of the optical waveguide block 810, waveguides may be formed to converge on a preset axis, for example, a center axis of the lens 820. The waveguides may be symmetrical about the axis. Thus, optical signals propagated through the waveguides may be output toward the center axis of the lens 820. In response to the optical signals being output toward the center axis, intervals between the optical signals arriving at the lens 820 may be less than or equal to intervals between ports of the output end. Thus, an alignment error of the lens 820 may be reduced or compensated. Furthermore, a reflection occurring at the ports of the output end may be solved.

Figure 9:
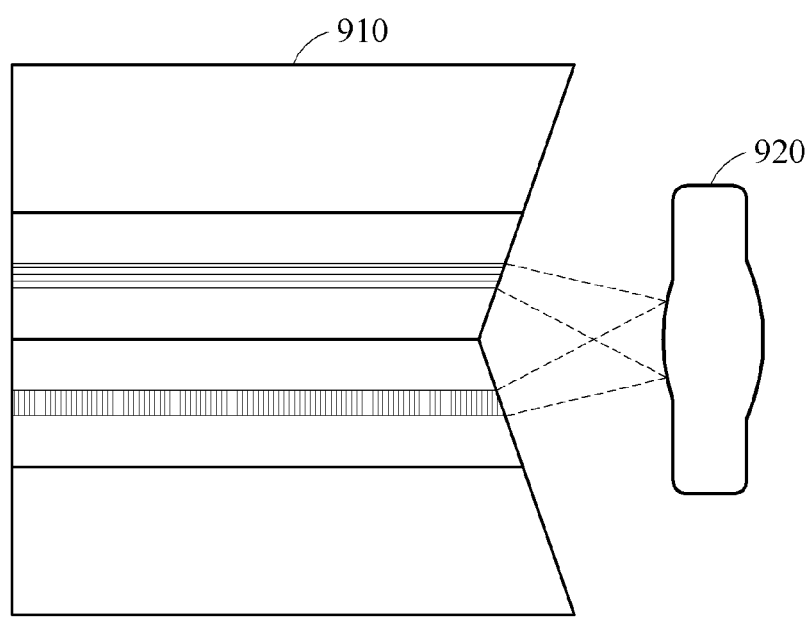
FIG. 9 is a diagram illustrating an optical waveguide block and a lens used to multiplex optical signals according to an example embodiment.

FIG. 9 is a diagram illustrating an optical waveguide block 910 and a lens 920 used to multiplex optical signals according to an example embodiment.

Referring to FIG. 9, the optical waveguide block 910 may be in a polyhedral shape with a polished output end instead of a rectangular parallelepiped shape. For example, the output end of the optical waveguide block 910 may be polished such that output signals output from waveguides converge on a center axis of the lens 920. Output ends of layers of the optical waveguide block 910 may have inclination angles symmetrical to each other.

In response to the optical signals being output toward the center axis, intervals between the optical signals arriving at the lens 920 may be less than or equal to intervals between ports of the output end. Thus, an alignment error of the lens 920 may be reduced or compensated. Furthermore, a reflection occurring at the ports of the output end may be solved.

Figure 10A:
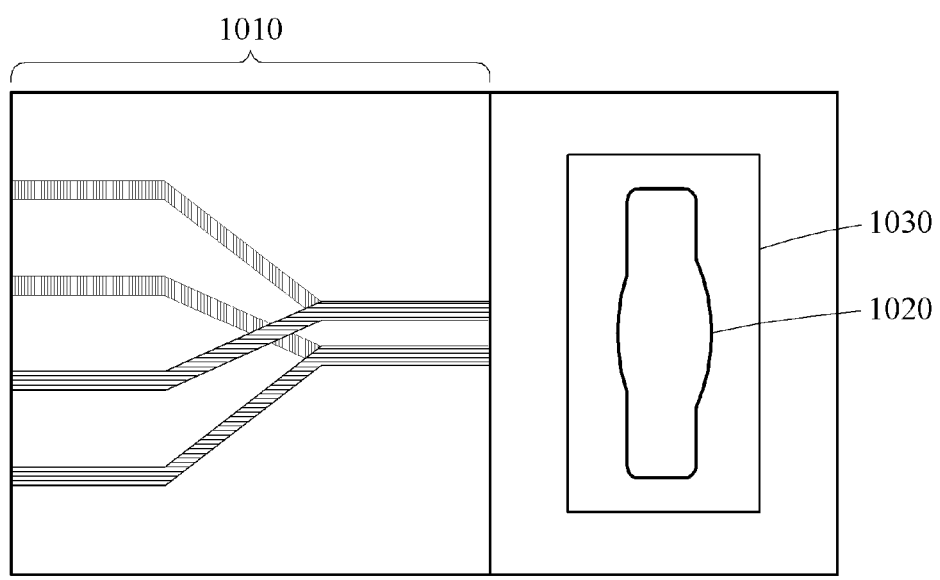
FIGS. 10A through 10C are diagrams illustrating an optical multiplexer having a structure for easily aligning a lens multiplexing optical signals according to an example embodiment.
Figure 10B:
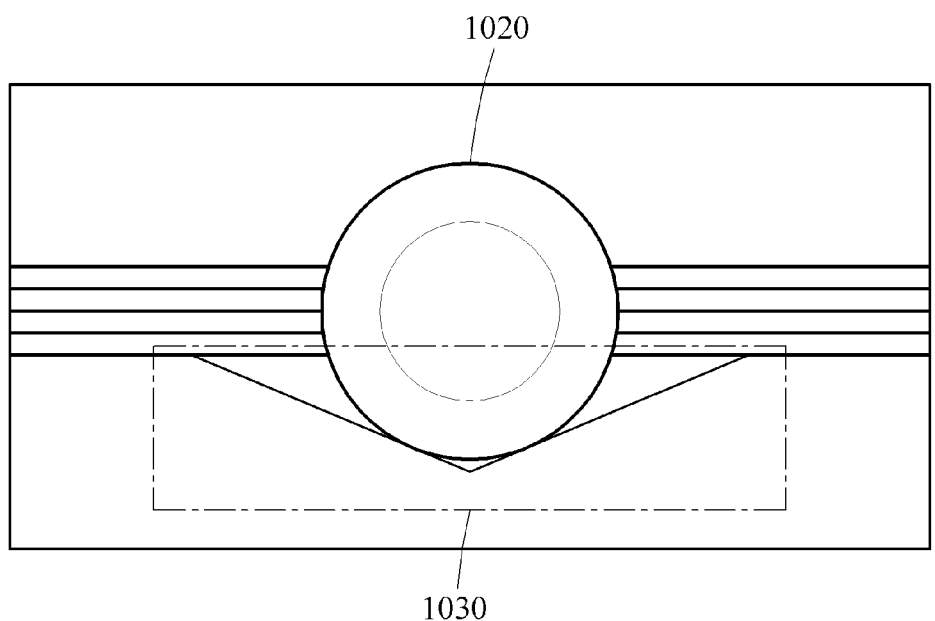
Figure 10C:
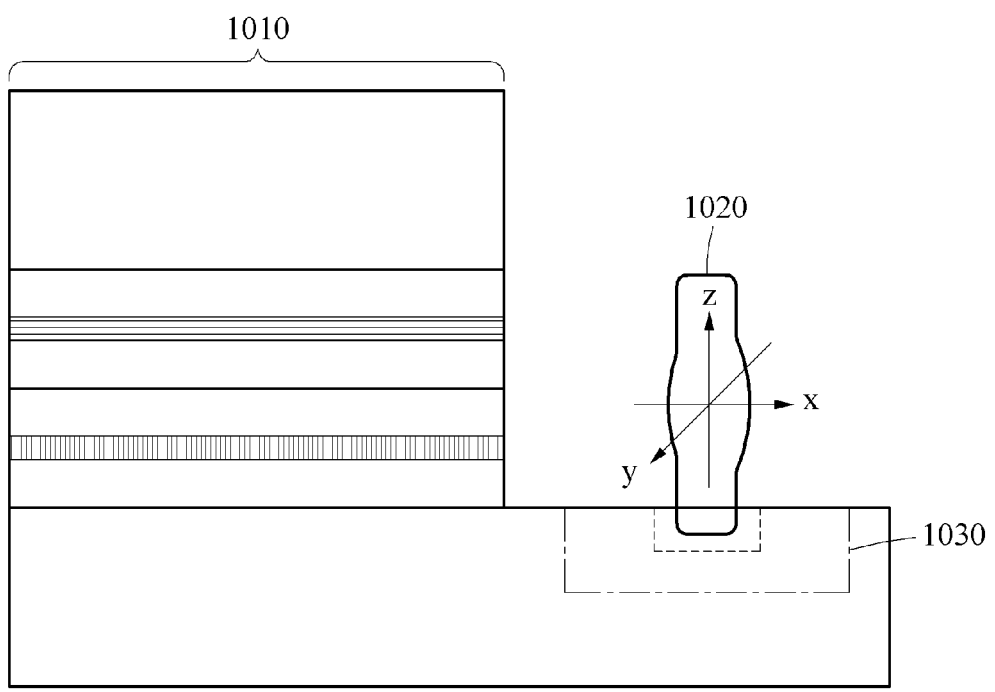

FIGS. 10A through 10C are diagrams illustrating an optical multiplexer having a structure for easily aligning a lens 1020 multiplexing optical signals according to an example embodiment.

Referring to FIGS. 10A through 10C, to easily align optical signals output from an optical waveguide block 1010 and the lens 1020, a groove 1030 may be included in the optical multiplexer for arranging the lens 1020. The groove 1030 may be generated on a substrate including the optical waveguide block 1010. FIG. 10A is a top view of the optical multiplexer including the groove 1030 in which the lens 1020 is to be disposed. FIG. 10B is a front view illustrating the optical multiplexer based on the lens 1020. FIG. 10C is a side view of the optical multiplexer.

The lens 1020 may be disposed or attached on the optical multiplexer using the groove 1030. A shape of the groove 1030 may be determined based on paths of optical signals output from the optical waveguide block 1010. When the lens 1020 is disposed on the groove 1030, a y-axial direction or a z-axial direction of the lens 1020 may be easily determined or fixed. Also, by moving the lens 1020 on the groove 1030, an x-axial position of the lens 1020 may be easily changed. Through this, an alignment of the lens 1020 may be efficiently performed.

An optical multiplexer may include an optical waveguide block including a plurality of waveguides for controlling optical paths of a plurality of optical signals. Optical signals generated in light sources having different wavelengths may be input to ports on one side, for example, an input end of the optical waveguide block, propagated through waveguides connected to the ports, and output to ports on the other side, for example, an output end of the optical waveguide block. Intervals between the waveguides may be reduced in a direction from the input end to the output end. For example, intervals between the ports of the input end of the optical multiplexer may be smaller than intervals between the ports of the output end of the optical multiplexer.

Also, the optical waveguide block may have a structure in which one or more layers including one or more waveguides are laminated. In this example, one or more optical signals output from the optical waveguide block may be arranged in each of a first direction, for example, an x-axial direction and a second direction, for example, a y-axial direction perpendicular to the first direction. A lens multiplexing the optical signals output from the optical waveguide block into one optical fiber may have a relatively small size, acceptable margin, or alignment margin.

According to example embodiments, it is possible to provide an optical multiplexer to multiplex optical signals having different wavelengths into one optical fiber with increased ease.

The components described in the exemplary embodiments of the present invention may be achieved by hardware components including at least one DSP (Digital Signal Processor), a processor, a controller, an ASIC (Application Specific Integrated Circuit), a programmable logic element such as an FPGA (Field Programmable Gate Array), other electronic devices, and combinations thereof. At least some of the functions or the processes described in the exemplary embodiments of the present invention may be achieved by software, and the software may be recorded on a recording medium. The components, the functions, and the processes described in the exemplary embodiments of the present invention may be achieved by a combination of hardware and software.

The processing device described herein may be implemented using hardware components, software components, and/or a combination thereof. For example, the processing device and the component described herein may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An optical multiplexer for multiplexing a plurality of optical signals, the optical multiplexer comprising:
   an optical waveguide block comprising a layer having a plurality of waveguides on which the plurality of optical signals are propagated; and
   a lens configured to output a multiplexed optical signal by collecting the plurality of optical signals output from the plurality of waveguides into one optical signal,
   wherein an interval between the plurality of optical signals output from the optical waveguide block is smaller than an interval between the plurality of optical signals input to the optical waveguide block.

2. The optical multiplexer of claim 1, wherein the plurality of waveguides is arranged on the layer such that the interval between the plurality of optical signals output from the plurality of waveguides is minimized.

3. The optical multiplexer of claim 1, wherein when the optical waveguide block comprises a plurality of layers, the plurality of layers is laminated perpendicular to a direction in which a waveguide is disposed on each of the plurality of layers.

4. The optical multiplexer of claim 3, wherein each of the plurality of layers comprises a mark having a preset shape to be used to align the plurality of layers when the plurality of layers is laminated.

5. The optical multiplexer of claim 3, wherein each of the plurality of layers comprises a groove configured to receive a guide pin used when the plurality of layers is laminated.

6. The optical multiplexer of claim 1, wherein the plurality of waveguides is arranged symmetrically based on a center axis of the lens.

7. The optical multiplexer of claim 1, wherein each of the plurality of optical signals has a different wavelength.

8. An optical multiplexer for multiplexing a plurality of optical signals, the optical multiplexer comprising:
   a plurality of input ports configured to receive the plurality of optical signals;
   an optical waveguide block comprising a layer having a plurality of waveguides corresponding to the plurality of input ports such that the plurality of optical signals is propagated through the plurality of waveguides;
   a plurality of output ports configured to output the plurality of optical signals propagated through the plurality of waveguides; and
   a lens configured to output a multiplexed optical signal by collecting a plurality of optical signals output from the plurality of output ports into one optical signal,
   wherein a distance between the plurality of input ports is determined based on a physical interference between the optical signals, a mutual crosstalk between channels, or a size and an arrangement of a light source element.

9. The optical multiplexer of claim 8, wherein a distance between the plurality of output ports is determined based on an acceptable margin of the lens.

10. The optical multiplexer of claim 8, wherein when the optical waveguide block comprises a plurality of layers, the plurality of layers is laminated perpendicular to a direction in which a waveguide is arranged on each of the plurality of layers.

11. The optical multiplexer of claim 8, wherein the optical waveguide block has a surface polished based on a preset inclination angle such that the plurality of optical signals output from the plurality of output ports is symmetrical to the lens.

12. The optical multiplexer of claim 8, wherein each of the plurality of optical signals has a different wavelength.

13. The optical multiplexer of claim 8, wherein a plurality of layers included in the optical waveguide block is aligned based on a mark generated in each of the plurality of layers.

14. An optical multiplexer for multiplexing a plurality of optical signals, the optical multiplexer comprising:

an optical waveguide block configured to adjust optical paths of the plurality of optical signals; and a lens configured to output a multiplexed optical signal by collecting a plurality of optical signals of which the optical paths are adjusted, wherein the optical waveguide block is obtained by combining layers, each having a plurality of waveguides used to adjust the optical paths.

15. The optical multiplexer of claim 14, wherein the optical waveguide block comprises:

a first surface configured to receive the plurality of optical signals; and a second surface configured to output the received plurality of optical signals, and wherein an interval between the plurality of optical signals output from the second surface is smaller than an interval between the plurality of optical signals received in the first surface.

16. The optical multiplexer of claim 15, wherein the plurality of waveguides is arranged on each of the layers such that the interval between the plurality of optical signals output from the plurality of waveguides is minimized.

17. The optical multiplexer of claim 15, wherein when the optical waveguide block comprises a plurality of layers, the plurality of layers is laminated perpendicular to a direction in which a waveguide is disposed on each of the plurality of layers.

18. The optical multiplexer of claim 17, wherein the optical waveguide block comprises a guide pin used when the plurality of layers is laminated.

19. The optical multiplexer of claim 18, wherein each of the layers comprises a groove configured to receive the guide pin.

* * * * *